(12) United States Patent
Mocanu et al.

(10) Patent No.: US 8,618,717 B2
(45) Date of Patent: Dec. 31, 2013

(54) SYSTEM AND METHOD FOR CONNECTION TO A WIRELESS NETWORK

(75) Inventors: Iulian Mocanu, Langley (CA); Mohsen Jalali, North Vancouver (CA); Adam Xue, Richmond (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 251 days.

(21) Appl. No.: 12/497,255

(22) Filed: Jul. 2, 2009

(65) Prior Publication Data

US 2011/0002261 A1 Jan. 6, 2011

(51) Int. Cl.
*H04W 4/00* (2009.01)

(52) U.S. Cl.
USPC ............ 310/328; 370/310; 370/329; 370/331

(58) Field of Classification Search
None
See application file for complete search history.

(56) References Cited

U.S. PATENT DOCUMENTS

| | | | |
|---|---|---|---|
| 5,812,819 A | 9/1998 | Rodwin et al. | |
| 6,175,903 B1 * | 1/2001 | Joo | 711/162 |
| 6,618,757 B1 | 9/2003 | Babbitt et al. | |
| 7,051,087 B1 | 5/2006 | Bahl et al. | |
| 7,072,340 B2 | 7/2006 | Agrawal et al. | |
| 7,301,923 B2 | 11/2007 | Petrescu et al. | |
| 7,463,607 B2 | 12/2008 | Sood et al. | |
| 2003/0142642 A1 * | 7/2003 | Agrawal et al. | 370/328 |
| 2004/0218558 A1 | 11/2004 | Johansson | |
| 2005/0060407 A1 * | 3/2005 | Nagai | 709/225 |
| 2005/0226209 A1 * | 10/2005 | Miyahara et al. | 370/351 |
| 2006/0002324 A1 * | 1/2006 | Babbar et al. | 370/325 |
| 2006/0174242 A1 * | 8/2006 | Zhu et al. | 717/172 |
| 2007/0106845 A1 * | 5/2007 | Chu | 711/132 |
| 2007/0195733 A1 * | 8/2007 | Noh | 370/331 |
| 2008/0096562 A1 * | 4/2008 | Wu et al. | 455/436 |
| 2009/0006585 A1 | 1/2009 | Chen | |
| 2009/0075698 A1 * | 3/2009 | Ding et al. | 455/558 |
| 2009/0117909 A1 * | 5/2009 | Kim et al. | 455/442 |
| 2009/0296567 A1 * | 12/2009 | Yasrebi et al. | 370/221 |

OTHER PUBLICATIONS

Droms, R., *Dynamic Host Configuration Protocol*, Bucknell University Standards Track, RFC 2131, Mar. 1997, 45 pages.

* cited by examiner

*Primary Examiner* — Anez Ebrahim
(74) *Attorney, Agent, or Firm* — Winstead PC

(57) ABSTRACT

The invention provides a method and system for connection and/or reconnection of a computing device to a wireless network. Embodiments of the system and method may, when appropriate, inhibit use of stored IP addresses, for example by deleting or effectively deleting stored IP addresses. By deleting or effectively deleting stored IP addresses, the computing device is influenced to request, via an associated wireless communication device, a new valid IP address from an access point which in turn requests a valid IP address from the wireless service provider server.

18 Claims, 5 Drawing Sheets

SYSTEM AND METHOD FOR CONNECTION TO A WIRELESS NETWORK

FIELD OF THE INVENTION

The present invention pertains in general to the field of wireless network connection and in particular to the connection and/or reconnection of a computing device to a wireless network.

BACKGROUND

When a user makes a connection from a computing device to the Internet through a wireless network connection, the wireless connection access point (AP) typically provides a validated Internet Protocol (IP) address to the computing device in order for the computing device to connect to the wireless network connection. For example, an IP address may be required to facilitate routing of packets and packet acknowledgements to the computing device. Microsoft Windows, and other operating systems store the IP address in memory. This stored IP address is then the IP address used as a default address when attempting to re-establish a connection to the wireless network. This storing capability can be advantageous for example when the computing device is stationary and is connecting to one access point each time a connection is requested. However, in the case of a mobile computing device moving between different access points, or where the IP address is no longer valid due to time considerations, the stored IP address will be an invalid address upon reconnection. In this case, the connection will not be established and after a predetermined amount of time, the computing device will release the IP address and request a new IP address for connection. This can result in a delay for the reconnection of a computing device to a wireless network.

One method by which IP addresses are assigned to devices is by the Dynamic Host Configuration Protocol (DHCP), which is currently defined for both IPv4 and IPv6 networks. In one version of the protocol, when a device connects to a network, an IP address, possibly along with additional configuration information, is requested and assigned by a DHCP server. Along with the IP address, the DHCP server may assign a lease time indicative of how long the IP address will remain valid. A DHCP server may allocate IP addresses using dynamic allocation, automatic allocation, or static allocation. In dynamic allocation, the DHCP server selects an IP address from a pool of addresses for assignment, along with a lease time. If the device does not renew the lease before lease time expiry, the DHCP server may assign that IP address to another device upon request. In automatic allocation, the DHCP server assigns an IP address substantially permanently to each device. The DHCP server stores in memory past IP address assignments to a particular device, and re-assigns the same IP address to the same device whenever possible. In static allocation, the DHCP server allocates an IP address to a device based on the device's MAC address according to a predetermined assignment table. Thus, the device is typically allocated the same IP address upon every request to that particular DHCP server. Typically, network administrators use automatic and static allocation when dealing with a relatively unchanging or manageable network, whereas dynamic allocation is implemented in larger or dynamically changing networks.

As described in Droms R., "Dynamic Host Configuration Protocol," Request for Comments (RFC) No. 2131, Internet Engineering Task Force, (March 1997), a client device may request allocation of an IP address in either a non-abbreviated procedure or an abbreviated procedure. In the non-abbreviated procedure, the client transmits a DHCPDISCOVER message and receives a DHCPOFFER message with an offer of an IP address and other configuration parameters. This is followed by a DHCPREQUEST message from client to server to accept the offer. The server then responds with a DCHPACK or DHCPNAK to indicate that the request is acknowledged or rejected, respectively. The abbreviated procedure may be used if the client device remembers and wishes to reuse a previously allocated IP address. In this case, the client begins by broadcasting a DHCPREQUEST message containing the remembered IP address in an appropriate field. If a server has knowledge of the client's configuration parameters, it responds with a DHCPACK message. Note that there is no guarantee that a server will be configured to respond to a request for an invalid IP address with a DHCPNAK response. Therefore, significant delays may be encountered when the client requests an invalid IP address and must wait for one or more timeouts before reverting to the non-abbreviated procedure.

In FIG. 1, there is shown a wireless communication diagram for an initial connection of a computing device to a wireless network, wherein the computing device utilizes a built-in or external wireless communication device for network access. When a user attempts to connect to a wireless network using computing device 200, this computing device typically sends a request for a connection 201 through the wireless communication device 202. The wireless communication device 202 sends a request to an access point 204 on the desired network requesting a connection 203 to the network and the access point 204 sends a request to the wireless service provider server 206 located on the network which requests a valid IP address to connect to the network 205. The wireless service provider server locates a valid IP address and sends the IP address 207 to the access point 204 which is forwarded 209 to the wireless communication device 202, and subsequently the IP address is forwarded 211 to the computing device 200. The computing device stores the IP address in its memory 213 and uses this IP address to communicate with the network.

As described above, the computing device stores the IP address that is received from the server in its memory upon receipt of the IP address. This storing procedure is generally used to store for example the ten most recent IP addresses used by the computing device to connect to one or more networks. This procedure can be advantageous when the computing device is requesting a connection to the same network through the same wireless communication device before the IP address has become invalid. When this is the case, the computing device sends the IP address along with the request for a connection, and the server accepts the request for connection as the IP address is still valid. This process can limit the number of requests to the server for valid IP addresses, thereby typically reducing traffic to and from the server.

With reference to FIG. 2, there is shown a wireless communication diagram for reconnection of a computing device to a wireless network. Before the computing device 200 attempts a connection through the wireless communication device 202, it looks in its memory to see if any IP addresses are stored 303. If there are IP addresses stored in the computing device's memory, the computing device sends a request for a connection along with an IP address from its memory 305 to the wireless communication device 202, which sends a request to the access point 204 requesting a connection and providing an IP address for the connection 307. The access point 204 sends a request to the wireless service provider server 206 requesting connection to the network through the IP address provided 309. If the IP address is no longer a valid IP address for connection to the network, the server 206 will not recognize the request and typically will not respond 311. After about 2 to 15 seconds of waiting for a response from the server 206, the computing device 200 will start the connection process over again. For example, computing device 200 may try to use the same IP address again or alternately may check its memory for another stored IP address 303. This process will continue until the computing device memory has no other IP addresses stored, a lease time on the IP address has expired, or a predetermined retry limit or timeout condition has been reached. The computing device 200 will then request a connection indicating that a new IP address is required.

This process of connection to a wireless network as described above can result in the performance of a loop of actions which can cause a delay in the connection of the computing device to a network. Furthermore, this delay associated with this connection and/or reconnection is further exacerbated when the computing device is mobile and therefore changing locations.

Therefore there is a need for a system and method enabling the connection and reconnection of a computing device to a wireless network that overcomes one or more of the problems identified in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for connection to a wireless network. In accordance with an aspect of the present invention, there is provided a wireless communication device configured to communicate with one or more network access points, the device comprising: a processor; a memory operatively coupled to said processor and adapted for storing one or more internet protocol addresses received from a corresponding network access point; and a deletion mechanism operatively coupled to said processor and said memory, the deletion mechanism adapted for deleting said one or more internet protocol addresses from said memory.

In accordance with another aspect of the present invention, there is provided a method for connection of a computing device to a wireless network, said computing device previously connected to one or more network access points using corresponding one or more internet protocol addresses, said one or more internet protocol address stored in a memory of said computing device, the method comprising: deleting the one or more internet protocol addresses from said memory; obtaining a new internet protocol address for said computing device, said computing device being communicatively linked to a network access point through a wireless communication device.

DETAILED DESCRIPTION OF THE INVENTION

Definitions

Figure 1:
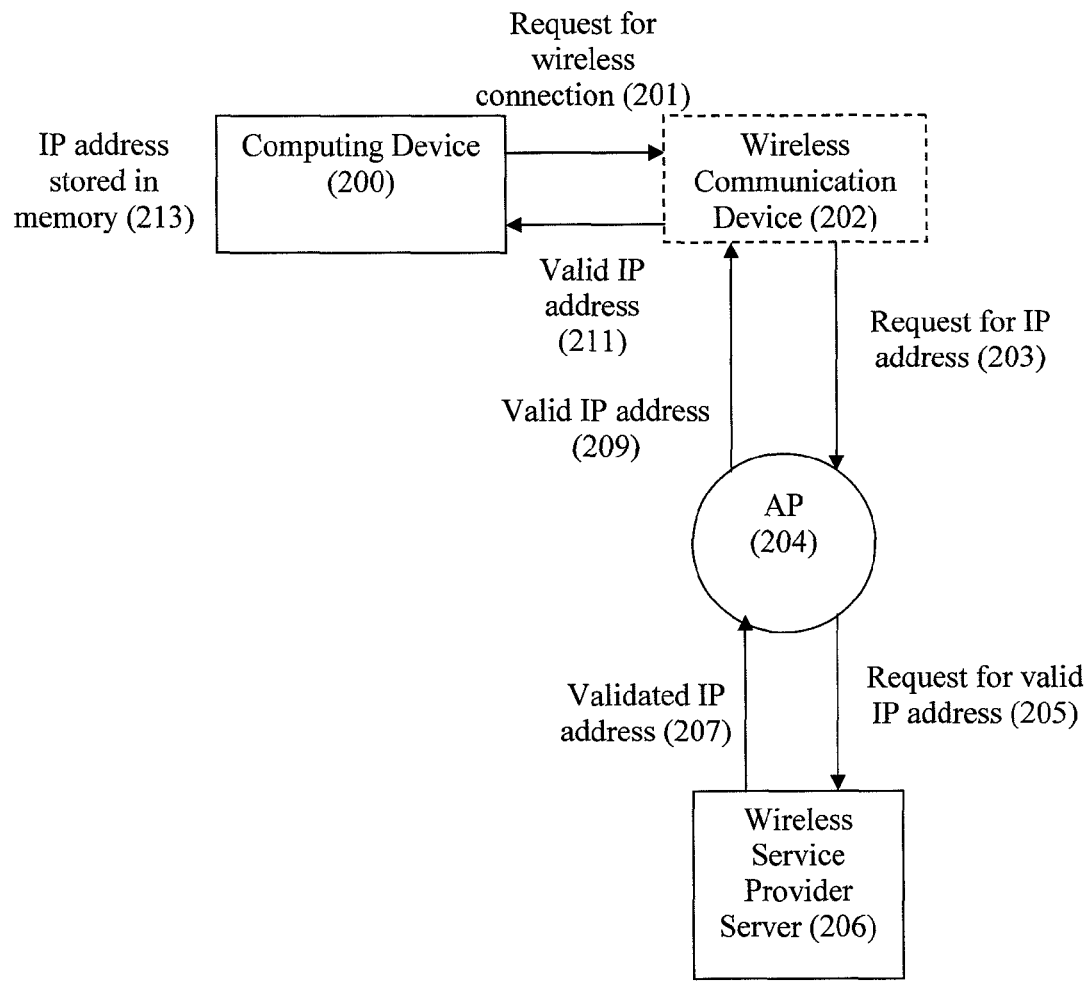
FIG. 1 illustrates a flow chart of a current state of the art connection process for a computing device connecting to a wireless network.

As used herein, the term "deletion" refers to the process of effectively or functionally removing access to one or more data entries from computer memory or of removing access by one or more computer programs to the data being deleted. For example, deletion may involve activities or operations such as: overwriting physical computer memory, resetting flags or program variables indicative of the presence of data stored in memory, adjusting or resetting pointers to memory locations, adjusting stack pointers, or the like. As used herein, the term "deletion" may also be used to refer to "effective deletion," or "temporary deletion" wherein data is temporarily rendered inaccessible to a computer program, for example by moving the data to a new memory location which is not accessible or disclosed to the computer program, or by adjusting pointers or flags temporarily so that the computer program does not have access to the data. Effectively deleted data may be restored at a future time.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The invention provides a method and apparatus for connection and/or reconnection of a computing device to a wireless network. Embodiments of the invention may, when appropriate, inhibit use of stored IP addresses, for example by deleting or effectively deleting stored IP addresses. By deleting or effectively deleting stored IP addresses, the computing device is influenced to request, via an associated wireless communication device, a new valid IP address from an access point which in turn requests a valid IP address from the Wireless Service Provider Server (hereinafter "Server"). This deleting and/or effective deleting can inhibit the time-consuming process of attempting to use stored IP addresses for establishing a connection to a new server, which is unlikely to succeed when the computing device which is mobile, for example has moved between networks. This may allow for a faster and/or more reliable reconnection process, for example when implemented on a computing device which is mobile.

In some embodiments, the wireless communication device provides a software application to the computing device which facilitates inhibiting use of stored IP addresses. The software application may be installed upon connection of the wireless communication device to the computing device. In some embodiments, the software inhibits use of stored IP addresses, for example by deleting a cache of one or more stored IP addresses or otherwise releasing the IP addresses prior to connection and/or reconnection of the computing device to a wireless network.

In some embodiments, stored IP addresses are deleted after disconnection of the computing device from a wireless network. For example, the disconnection event may trigger software or firmware to delete or effectively delete the one or more stored IP addresses. On subsequent reconnection to a wireless network, the computing device will be influenced to request a new IP address, since no stored IP addresses will be available after such deletion.

In some embodiments, one or more stored IP addresses are deleted prior to connection and/or reconnection of the computing device to a network. For example, events indicative of initiation of network connection activities may trigger software or firmware to delete or effectively delete the one or more stored IP addresses. The addresses may be deleted prior to further network connection activities which might otherwise attempt to use the one or more stored IP addresses in establishing a network connection. This may substantially reduce or eliminate inappropriate usage of stored but potentially invalid IP addresses.

The System

As discussed previously according to the prior art, upon request, a wireless connection access point (AP) provides a validated Internet Protocol (IP) address to a computing device in order for the computing device to connect to the wireless network connection. Microsoft Windows™, and other operating systems store the IP address in memory. This stored IP address is then the IP address used as a default address when attempting to re-establish a connection to the wireless network. This storing capability is advantageous when the computing device is stationary and is connecting to one access point each time a connection is requested. However, in the case of a mobile computing device moving between different access points, or where the IP address is no longer valid due to time considerations, the stored IP address will likely be an invalid address upon reconnection. The connection will not be established and after a predetermined amount of time, the computing device will release the IP address and request a new IP address for connection. It is this time-out, release and request for a new IP address that causes an inconvenient extra 5 to 10 second delay. For example, a computing device can be communicatively linked with a wireless network via a wireless modem. In this example, the computing device could have saved in its memory an IP address which it had previously used to connect to the wireless modem and ultimately to the wireless network, in order to potentially expedite the subsequent reconnection. However, upon movement of the computing device and associated wireless modem to another location, the IP address for wireless network access via the wireless modem will change, and this delay during the reconnection process results from the computing device "assuming" that the previous IP address, which is stored in memory thereof, remains correct for connection to the wireless network via the wireless modem. As such, for this example, the delay during the reconnection process, which at least in part results from one or more previously saved IP addresses, manifests itself in the interface between the wireless modem and the computing device's operating system.

In general an IP address has a timeout period for temporary loss of connection of about 40 to 50 minutes. This means that if the initial connection achieved as described above is lost either by the user requesting disconnection from the network, or lost due to other reasons that would be commonly understood by an ordinary person skilled in the art, the user would have about 40 to 50 minutes to reconnect to the network using the same IP address as the IP address would remain valid for connection to the network for a set time period. After this time period, the IP address will likely not be a valid IP address to connect to the network and a new IP address is required to re-connect to the network. For example, if an IP lease held by a first device expires, the server may allocate it to another device, thus rendering the IP address unusable by the first device.

As described herein, the computing device typically stores the IP address that is received from the server in its memory upon receipt of the IP address. For example, this storing procedure may be used to store some of the most recent IP addresses used by the computing device to connect to one or more networks. For example, the ten most recent IP addresses may be stored, or IP addresses used in the last 30 days may be stored. This procedure is advantageous when the computing device is requesting a connection to the same network through the same wireless communication device before the IP address has become invalid. When this is the case, the computing device sends the IP address with the request for a connection, and the server accepts the request for connection as the IP address is still valid. This process limits the number of requests to the server for valid IP addresses, lessening the amount of traffic to and from the server.

Figure 2:
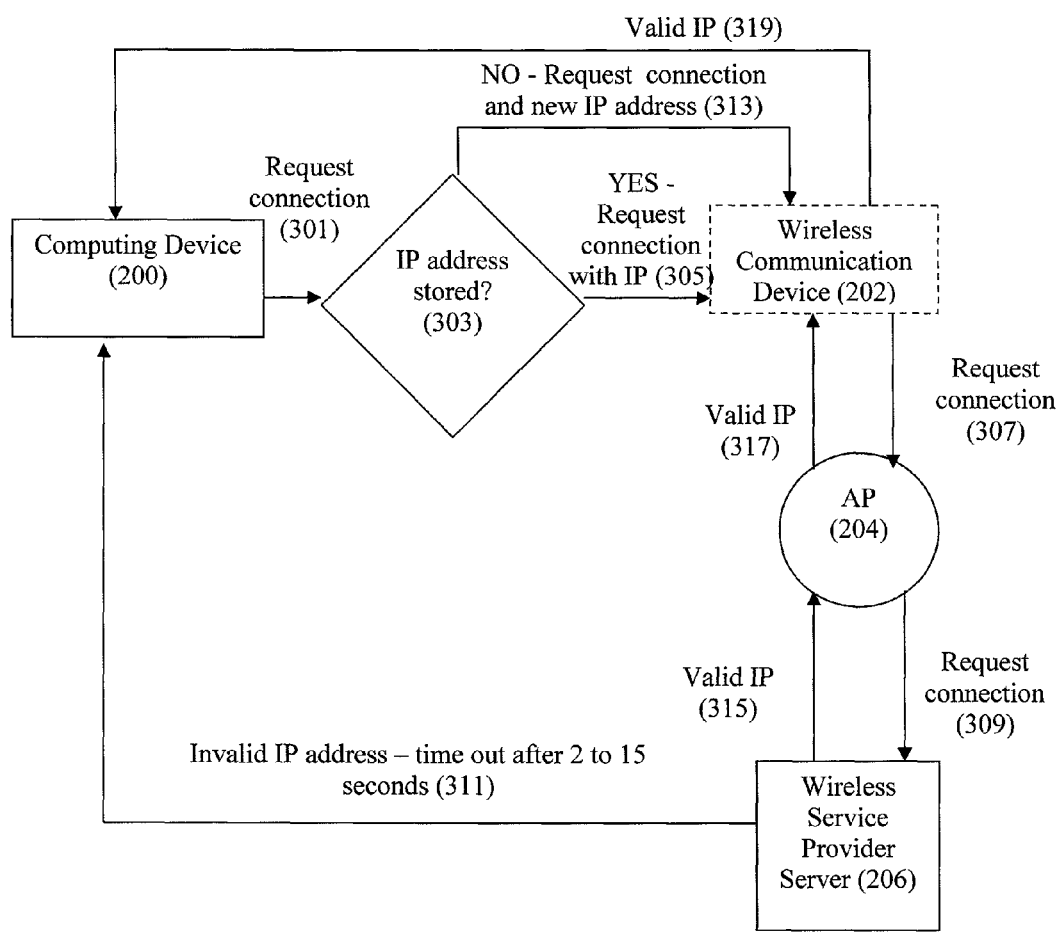
FIG. 2 illustrates a flow chart of a current state of the art reconnection process for a computing device re-connecting to a wireless network.

However, when the computing device is mobile between networks, the practice of storing and reusing IP addresses may result in delays, since such stored IP addresses generally are not portable between networks. The system and method may be used to inhibit the process of checking one or more such stored IP addresses and waiting for timeouts if the server does not respond to a request containing an invalid IP, for example using the process as described with respect to FIG. 2, when the computing device is mobile. Such a process, if not inhibited, might continue in a loop or chain until the computing device no longer has any IP addresses stored, delaying the connection to the network. For example, if ten invalid IP addresses were stored in cache, and about 15 seconds was required to determine that each stored IP address was invalid, then there could be a total delay of up to about 150 seconds before all ten IP addresses were determined to be invalid. A 15-second delay would occur, for example, if a server did not respond to a connection request, and the computing device was configured to wait for a 15-second timeout timer to expire before abandoning the request. Timeout timer values are typically implementation dependent, and may vary.

Figure 3:
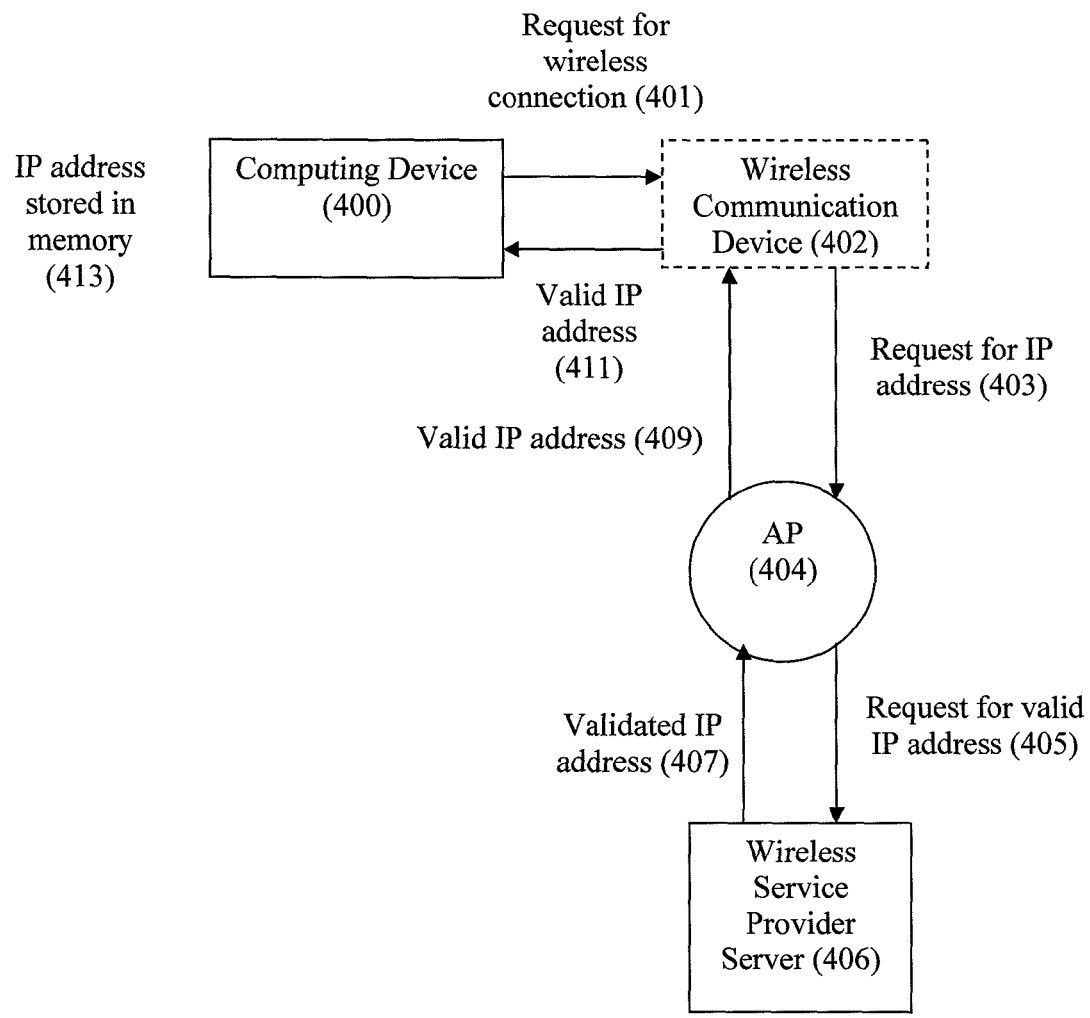
FIG. 3 illustrates a flow chart of a connection process for a computing device connecting to a wireless network, when there are no stored IP addresses available to the computing device.

The invention provides for a method that substantially inhibits or eliminates the loop that can cause a delay in the connection or reconnection of a computing device to a wireless network as described herein. In FIG. 3, there is shown a wireless communication diagram for a connection of a computing device to a wireless network when there are initially no stored IP addresses available to the computing device. When a user attempts to connect to a wireless network using a computing device 400, the computing device 400 sends a request for a connection 401 through the wireless communication device 402. The wireless communication device 402 sends a request to an access point 404 on the desired network requesting a connection 403 to the wireless network. The access point 404 sends a request to the wireless service provider server 406 located on the wireless network requesting a valid IP address to connect to the wireless network 405. The wireless service provider server locates a valid IP address and sends the IP address 407 to the access point 404. The access point 404 forwards the valid IP address 409 to the wireless communication device 402, which then forwards the IP address 411 to the computing device 400. The computing device stores the IP address in its memory 413 and uses the IP address to communicate with the wireless network.

Figure 4:
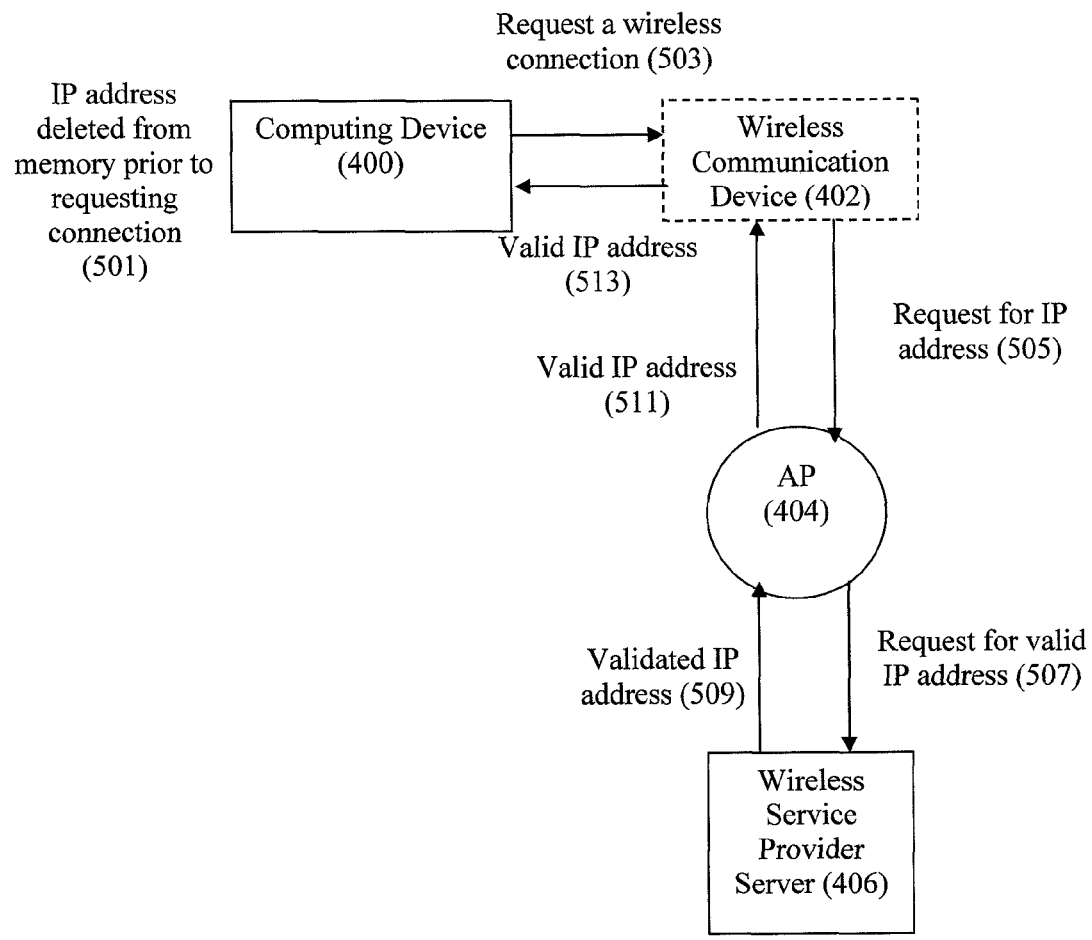
FIG. 4 illustrates a flow chart of a connection and/or reconnection process for a computing device connecting to a wireless network according to embodiments of the invention.

However, with reference to FIG. 4, the process for connection and/or reconnection to a wireless network as provided by embodiments of the invention is substantially different from the process of the prior art. In some embodiments of the invention, prior to requesting a connection to a wireless network the computing device 400 requests that the IP addresses stored in its memory be deleted or effectively deleted 501. After the IP addresses have been deleted from the computing device's memory, the computing device 400 requests a connection to the wireless network 503 through the wireless communication device 402. The wireless communication device requests a connection to the wireless network 505 through the access point 404. The access point 404 requests a valid IP address for connection to the wireless network 507 from the server 406. The server 406 provides the access point 404 with a valid IP address for connection to the wireless network 509. The access point 404 provides the valid IP address 511 to the wireless communication device 402, which provides the valid IP address 513 to the computing device 400. The computing device 400 then initiates communication with the wireless network through the valid IP address.

In some embodiments, the step of deleting or effectively deleting IP addresses stored in memory may be triggered by disconnection from a wireless network. For example, a software or firmware application or agent may be configured to monitor for network disconnection events such as DHCP IP release messages, prolonged loss of network traffic, relocation of the computing device, power down events, or the like. Upon detection of events indicative of a network disconnection, stored IP addresses in a predetermined location may be deleted or effectively deleted.

In some embodiments, the step of deleting or effectively deleting IP addresses stored in memory may be triggered by initiation of network connection or reconnection activities. For example, a software or firmware application or agent may be configured to monitor for network connection events such as user or program-initiated actions which will likely lead to a network connection being requested. Upon detection of events indicative of pending or imminent network connection or reconnection activities, stored IP addresses in a predetermined location may be deleted or effectively deleted.

In some embodiments, the system may be selectively enabled such that it is operable to delete or effectively delete stored IP addresses when the computing device is more likely to be mobile. Stored IP addresses may be left undeleted when the computing device is more likely to be stationary or connecting to a network for which a stored IP address is likely to be valid. Embodiments of the invention may be configured to be responsive to one or more conditions which can indicate that the computing device is moving or stationary. For example, switching a laptop to battery power, changing a clock by hour increments in accordance with a time zone change, changes in login times or user behaviours, explicit user input, observations of radio environments or other changes in location indicators such as coordinates of a GPS module coupled to the computing device, may be indicative of device being in motion or stationary. In some embodiments, the system may be configured to infer mobility using such inputs, for example via operation of an appropriately configured Bayesian network.

In some embodiments, stored IP addresses may be effectively deleted when the computing device is more likely to be mobile, and then restored when the computing device is more likely to be stationary. For example, a cache of IP addresses may be moved to an inaccessible memory location and then later restored, or a pointer to the cache of IP addresses may be adjusted to point to different memory locations, one of which contains a cache of IP addresses, and another which contains an empty list. As another example, if the IP addresses are contained in a stack, the stack pointer may be temporarily set equal to the base pointer so that the stack appears empty. When the cache of IP addresses is to be restored, the stack pointer may be reset to its former value, namely that of the base pointer plus an offset substantially equal to the number of IP addresses stored in the stack cache.

In some embodiments, the wireless communication device further includes a restoration mechanism adapted for restoring temporarily or effectively deleted IP addresses to memory. For example, the IP addresses may be deleted by a deletion mechanism when the wireless communication device is deemed to be mobile, and restored by the restoration mechanism when the wireless communication device is deemed to be stationary. The deletion and restoration mechanisms may be implemented as hardware, software, firmware, or a combination thereof, or the like.

Computing Device

The computing device may be configured as a general purpose or special purpose computing system, including but not limited to, personal computers, server computers, handheld, laptop or mobile computer or communications devices such as cell phones and PDA's, multiprocessor systems, microprocessor systems, network PCs, minicomputers, mainframe computers, distributed computing environments that include one or more of the above systems or devices, or other processing device configuration as would be readily understood by a worker skilled in the art. Components of a computing device may include but are not limited to a processing unit, a system memory, and a system bus that couples various system components including the system memory and the processing unit. A computer system memory can include, but is not limited to RAM, ROM, EEPROM, flash memory or other memory technology, CD-ROM, digital versatile disks (DVD) or other optical disk storage, magnetic cassettes, magnetic tape, magnetic disk storage, or other magnetic storage, or any other medium which can be used to store the desired information and which can be accessed by the computer. The processing unit may include input and output interfaces in order for the computing device to receive input from a user and send output to a user.

In some embodiments of the invention, the computing device is communicatively linked to a wireless communication device which provides the computing device access to a wireless network. For example, the computing device may be but is not limited to a desktop computer wherein the desktop computer is linked by a network cable to a wireless-enabled hardware component such as a wireless capable modem which acts as the wireless communication device.

In some embodiments, the computing device includes or is operatively coupled to a wireless communication device configured to provide the computing device access to a wireless network. For example, the computing device may be but is not limited to a laptop operatively coupled to a wireless-enabled hardware component such as a wireless network card, an adapter such as a USB™ adapter, or an embedded communication module which acts as the wireless communication device.

In some embodiments, the computing device is used by a user to connect to a wireless network. The user may request a connection to a wireless network, or launch a program which automatically requests a connection, for example. The computing device sends a request for a connection to a wireless network to the wireless communication device. The wireless communication device provides the computing device with an IP address which allows the computing device to communicate with the wireless network server. The user may request information from the network server and the computing device sends this request to the server via the wireless communication device and receives the subsequent information from the wireless communication device and displays the information for the user.

Wireless Communication Device

In some embodiments of the invention, the wireless communication device is a component of the computing device, for example a substantially integral or plug-in component. The computing device may comprise a wireless-enabled hardware component that allows the computing device to communicate over a wireless network, some hardware that may be installed for communication over a wireless network include but are not limited to a wireless network card, embedded wireless module or chipset, wireless network adapter, wireless network interface controller (WNIC), wireless network interface card, or wireless LAN adapter. In some embodiments of the invention, the computing device may be but is not limited to a laptop with a wireless network card installed as the wireless communication device which allows the laptop to communicate with a wireless network.

In some embodiments, the wireless communication device is communicatively linked to the computing device. Some examples of wireless communication devices that can be used as data modems to form a wireless communication device connecting a desktop computer to the Internet include but are not limited to mobile phones, smartphones, and PDAs. To the desktop computer, these devices typically appear as an external modem when connected via serial cable, USB™, Firewire™, IrDA™ infrared, Bluetooth™ or the like. Wireless FireWire™, USB™ and Serial modems can also be used in the Wi-Fi and WiMAX standards, to give a laptop, PDA or desktop computer access to a wireless network. PCMCIA, ExpressCard and Compact Flash modems can also be used as wireless communication devices to provide a computing device with access to a wireless network.

In some embodiments of the invention, the wireless communication device is communicatively linked to one or more access points within a wireless network. The wireless communication device is configured to communicate with the computing device and one or more wireless access points. The wireless communication device receives a signal from the computing device requesting a connection to a wireless network. The wireless communication device then sends a request signal to a wireless access point requesting a connection to the wireless network that the access point is connected to. The wireless communication device receives an IP address from the access point and forwards the IP address to the computing device. The computing device sends further requests to the network server through the wireless communication device where the wireless communication device translates the computing device request into a signal that is understood by the server, and then receives the communication back from the server and translates the communication from the server into data understood by the computing device.

Figure 5:
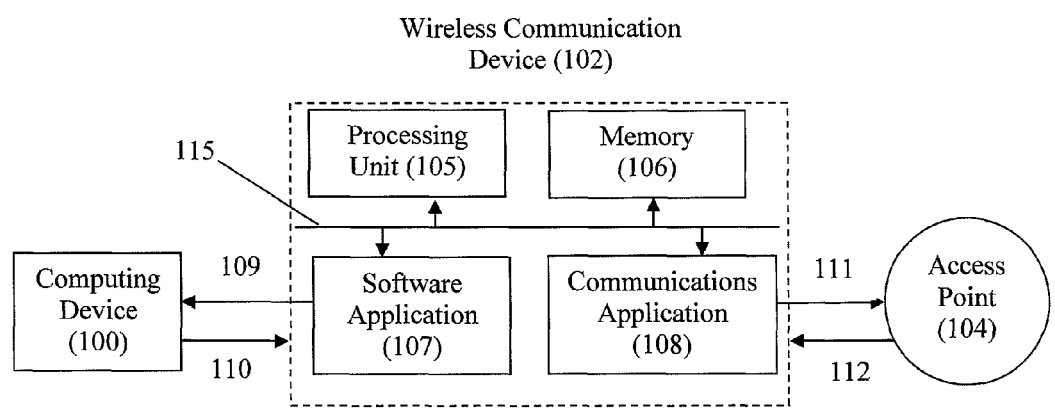
FIG. 5 illustrates components of a wireless communication device according to embodiments of the invention.

With reference to FIG. 5, in some embodiments, the wireless communication device 102 comprises but is not limited to a processing unit 105, a memory 106, a software or firmware application 107 and a communications application 108, all components being communicatively linked via a system bus 115 as commonly understood by an ordinary person skilled in the art. In some embodiments, the wireless communication device 102 is communicatively linked 109 to a computing device 100. Upon being communicatively linked 109 to the computing device 100, the wireless communication device 102 downloads the software or firmware application 107 to the computing device 100 through the link 109. The software or firmware application 107 comprises instructions to be executed by the computing device 100 for connection to a wireless network. The software or firmware application 107 instructs the computing device 100 to delete its memory of old IP addresses that have been stored from previous network connections.

In some embodiments, the software or firmware application 107 is a software agent, such as a mobile software agent and/or persistent software agent. The agent may act on behalf of the wireless communication device to delete or effectively delete IP addresses stored on the computing device.

In some embodiments, the software or firmware application 107 allows for the computing device 100 to delete its memory of IP addresses upon disconnection of the computing device 100 from a network connection.

In another embodiment, the software or firmware application 107 allows for the computing device 100 to delete its memory of IP addresses prior to requesting a connection to a wireless network.

In some embodiments, the wireless communication device 102 further comprises a communications application that is communicatively linked 111 to one or more access points 104. The communications application 108 comprises one or more communications protocols for controlling or enabling a connection, communication and data transfer between computing devices. Communications protocols may include protocols operating in accordance with various communication layers for example as described by the Open Systems Interconnection (OSI) Model, including the transport layer, network layer, link layer, and physical layer. Protocols may include but are not limited to TCP, UDP, DCCP, SCTP, RSVP, ECN, IP, Ipv4, Ipv6, ICMP, ICMPv6, IGMP, IEEE 802 series protocols such as IEEE 802.11 and IEEE 802.15.4, Wi-MAX, HiperLAN/2, Flash-OFDM, CDMA, W-CDMA, EV-DO, GSM, UMTS, EDGE, 1xRTT, HSDPA, HSUPA, HSPA, or portions thereof, and other communications protocols as commonly understood by an ordinary person skilled in the art.

In some embodiments, the wireless communication device 102 comprises a processing unit 105 configured to execute instructions received by the wireless communication device 102. In some embodiments, the wireless communication device further comprises a memory 106. The memory 106 can include, but is not limited to RAM, ROM, EEPROM, flash memory or other memory technology, CD-ROM, digital versatile disks (DVD) or other optical disk storage, magnetic cassettes, magnetic tape, magnetic disk storage, or other magnetic storage, or any other medium which can be used to store the desired information and which can be accessed by the processing unit 105.

NAT Coupling

In some embodiments, the wireless communication device and the computing device are operatively coupled through a network address translator (NAT). The NAT maps an IP address used by the computing device to and from an IP address usable for connection to a currently available network of a wireless service provider, for example via an access point. The NAT may be implemented as a module within the wireless communication device, for example.

As would be readily understood by a worker skilled in the art, a NAT may be implemented as a look-up table or translation function, which translates an internal IP address space to an external IP address space. For example, one or more internal IP addresses used in communication between the computing device and the wireless communication device or NAT may be translated at the NAT to one of one or more external IP addresses used in communication between the wireless communication device or NAT and a wireless network. Translation may also be performed in the reverse direction, from external IP addresses to internal IP addresses. Other features of a NAT, such as stateful translation, IP masquerading, port forwarding, port address translation, and the like, would be readily understood by a worker skilled in the art.

In some embodiments, use of a NAT may enable the computing device to utilize a static or even arbitrary IP address, with this IP address mapped to and from a usable IP address via the NAT. For example, the computing device and wireless communication device operatively coupled thereto may be configured such that the computing device sees the wireless communication device as a DHCP server. This DHCP client-server relationship may be configured for automatic, static, or even dynamic IP address allocation. In some embodiments, the internal IP address, that is the IP address used in communication between the computing device and the wireless communication device, may be a non-routable address, for example 10.0.0.2 or 192.168.0.2. Due to the use of a NAT, the internal IP address may remain the same even when the external IP address, that is the IP address used by the wireless communication device for connection to a wireless network, changes due to changing location or change of network.

In some embodiments, the external IP address may be stored in a cache memory, for example a cache memory within the wireless communication device. This cache memory may be different than a cache memory used by the computing device for storing IP addresses. Embodiments of the present invention may include a deletion mechanism operatively coupled to the cache memory storing external IP addresses. The deletion mechanism may be adapted to delete this cache memory, for example to inhibit use of potentially invalid IP addresses so as to speed up network connection or reconnection operations when the wireless device is mobile between networks. The deletion mechanism may operate upon disconnection of the wireless device and associated computing device from a network, or prior to connection to a network.

In some embodiments, the wireless device does not store any external IP addresses, and as such each time connection is required, the wireless device requests an external IP address.

Access Points

Access points (AP) or wireless access points (WAP) as commonly understood by one of ordinary skill in the art are specially configured nodes on wireless networks. Access points act as a central transmitter and receiver of radio signals. Access points are devices that allow wireless communication devices to connect to a wireless network using standards such as but not limited to Wi-Fi, Bluetooth or other standards that would be readily known to one of ordinary skill in the art. The WAP usually connects to a wired network, and can relay data between the wireless devices, such as but not limited to computers, laptops, PDAs, cell phones, minicomputers or printers and wired devices on the network.

In some embodiments, the access point receives a request signal from a wireless communication device requesting a connection to the wireless network that the access point is connected to. The access point sends a request signal to the wireless service provider server requesting a valid IP address for connection to the wireless network. The access point receives an IP address from the wireless service provider server and forwards the IP address to the wireless communication device. The access point then acts as a link, such as a router, bridge, relay, or the like, between the computing device plus wireless communication device and the wireless service provider server. Such a link is useful since, in most cases, the computing device is located too far from the actual wireless service provider server to have a direct connection to the server.

Wireless Service Provider Server

A Wireless Service Provider Server is a server configured to provide specific types of services. As would be commonly understood by one of ordinary skill in the art, a server is a combination of hardware and/or software designed to provide services to clients. In some embodiments, a wireless service provider server may be but is not limited to an Internet Service Provider Server (ISP) or a cellular or other communication carrier providing data services, which provides a computing device access to the Internet. ISPs can use a number of technologies to allow clients access to the network. Some technologies that may be used include, but are not limited to, dial-up, DSL including Asymmetric Digital Subscriber Line (ADSL), broadband wireless, cable modem, fiber to the premises (FTTH), and Integrated Services Digital Network (ISDN), Ethernet, Metro Ethernet, Gigabit Ethernet, Frame Relay, ATM, satellite Internet Access and synchronous optical networking (SONET), or other technologies as would be commonly understood by one of ordinary skill in the art.

In some embodiments, the wireless service provider server provides access for a computing device to a wireless network using an IP address. The server receives a request from the access point requesting a valid IP address. The server provides a valid IP address to the access point to forward to the computing device for use in communication with the wireless network. The computing device uses that IP address to communicate with the server to retrieve information from the network that the server is connected to. Upon a request from the wireless communication device, the server retrieves the requested information from the network and provides the information back to the wireless communication device. In some embodiments, the server receives the request for information from the access point and provides the information to the access point to forward to the wireless communication device. In some embodiments, the assignment of IP addresses is performed substantially in accordance with the DHCP protocol.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

In addition, while the above discusses the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

The invention will now be described with reference to specific examples. It will be understood that the following examples are intended to describe embodiments of the invention and are not intended to limit the invention in any way.

EXAMPLE

In some embodiments, the system and method may be applied to a personal laptop computer, as the computing device, comprising a wireless network card, as the wireless communication device. The laptop may be used in an office setting on a regular day-to-day basis. An office may be set up to allow wireless access on to a network from the laptop which has a wireless network card configured to connect to the wireless network within the office. On a regular day-to-day basis, the laptop can quickly and easily connect to the wireless network within the office by requesting a connection to the wireless network and providing the stored IP address as it will be a valid IP address for the office network. In small Local Area Networks (LAN) the administrator of the network system often assigns IP addresses to each computing device that will be used to connect to the office network, allowing for quick and easy access to the office network on a regular day-to-day basis. For example, static or automatic DHCP IP allocation may be used in this regard. Therefore, the storing of the IP address, in this situation, provides for a faster reconnection throughout the day if a connection is lost or the user disconnects from the network. However, if the user is sent on a trip away from the office and needs to connect to the office network from a separate location, the system and method allows for a faster more reliable reconnection to the network via a wireless Internet connection.

Often in hotels and similar locations there is provided one or more access points for accessing the Internet via a wireless communication device. In the present embodiment, the laptop comprises a wireless communication device, the wireless network card. As the laptop has been used to connect to the Internet through the office network previously, the laptop has a number of IP addresses stored in its memory. Accordingly, upon a request for a connection to the wireless network from the new location within the hotel, the system is operable to delete or effectively delete the stored IP addresses, thereby prompting the laptop to request a new IP address when requesting a connection to the wireless network using the access point and server.

Embodiments of the system as described above allow for a software program installed on the wireless network card to be downloaded to the laptop upon connection. The software program contains instructions to be executed by the processing unit within the laptop. Upon either disconnection of the laptop from a network connection, or prior to requesting a connection to a wireless network, or both, the laptop will run the software program, and the software program will instruct the processing unit to delete the laptop's memory of all old IP addresses stored. After this is completed, the laptop can then request a connection to the wireless network via the wireless network card, and as there are no IP addresses stored in its memory, it will also request a new IP address to connect to the wireless network. This process will allow the laptop to connect to the wireless network in one request rather than requesting a connection a number of times with no response from the server, providing a faster reconnection to the wireless network.

It is obvious that the foregoing embodiment of the invention is an example and can be varied in many ways. Such present or future variations are not to be regarded as a departure from the spirit and scope of the invention, and all such modifications as would be obvious to one skilled in the art are intended to be included within the scope of the following claims.

We claim:

1. A mobile wireless communication device configured to facilitate communication between a host computing device and one or more network access points when the mobile wireless communication device is operatively coupled to the host computing device, the host computing device comprising a processor and a host memory operatively coupled to said processor and adapted for storing one or more Internet protocol addresses received from a corresponding network access point, the mobile wireless communication device comprising:

a deletion mechanism stored on a memory of the mobile wireless communication device, wherein at least one of the one or more internet protocol addresses is temporarily deleted by said deletion mechanism, and the mobile wireless communication device configured to transfer the deletion mechanism to the host computing device, the deletion mechanism operatively coupled to said processor and said host memory following said transfer, the deletion mechanism adapted for: presuming that the one or more stored internet protocol addresses are potentially invalid due to a change in location of the mobile wireless communication device; and inhibiting use of said one or more stored internet protocol addresses by deleting the one or more stored internet protocol addresses from said host memory following said presumption, thereby influencing the host computing device to request a new valid internet protocol address;

and a restoration mechanism operatively coupled to said processor and said memory, the restoration mechanism adapted for restoring said at least one of one or more temporarily deleted internet protocol addresses to said memory.

2. The mobile wireless communication device of claim 1, wherein the mobile wireless communication device includes a wireless-enabled hardware component selected from the group comprising: wireless capable modems, wireless network cards, wireless adapters, embedded communication modules, wireless network interface controllers, and wireless LAN adapters.

3. The mobile wireless communication device of claim 2, wherein the computing device and the wireless-enabled hardware component are operatively coupled using a connection protocol selected from the group comprising: USB™, IrDA™ infrared, PCMCIA™, ExpressCard™, and Firewire™.

4. The mobile wireless communication device of claim 1, wherein inhibiting use of the one or more internet protocol addresses involves a deletion operation selected from the group comprising: overwriting physical computer memory, resetting flags or program variables indicative of the presence of data stored in memory, temporarily moving data to a new memory location, and temporarily adjusting pointers or flags.

5. The mobile wireless communication device of claim 1, wherein the deletion mechanism is operated if the mobile wireless communication device is determined to be mobile between networks, access points, or both.

6. The mobile wireless communication device of claim 1, wherein the restoration mechanism is operated if the mobile wireless communication device is determined to be stationary.

7. The mobile wireless communication device of claim 1, wherein the deletion mechanism is operated upon disconnection of the mobile wireless communication device from the wireless network.

8. The mobile wireless communication device of claim 1, wherein the deletion mechanism is operated prior to initiating connection of the host computing device to the wireless network.

9. A method for connection of a mobile computing device to a wireless network via a mobile wireless communication device operatively coupled to the mobile computing device, said mobile computing device previously connected to one or more network access points using corresponding one or more internet protocol addresses, said one or more internet protocol addresses stored in a memory of said mobile computing device, the method comprising:
   initiating a configuration operation for configuring the mobile computing device, the configuration operation initiated by the mobile wireless communication device;
   wherein the configuration operation causes the mobile computing device to: make a presumption that the one or more stored internet protocol addresses are potentially invalid due to a change in location of the mobile computing device;
   and inhibit use of the one or more stored internet protocol addresses stored in said memory by deleting the one or more stored internet protocol addresses from said memory following said presumption, wherein at least one of the one or more internet protocol addresses is temporarily deleted
thereby influencing said mobile computing device to request a new valid internet protocol address, said mobile computing device being communicatively linked to a network access point through the mobile wireless communication device;
   and restoring the at least one temporarily deleted internet protocol address.

10. The method of claim 9, wherein inhibiting use of the one or more interne protocol addresses involves a deletion operation selected from the group comprising of: overwriting physical computer memory, resetting flags or program variables indicative of the presence of data stored in memory, temporarily moving data to a new memory location, and temporarily adjusting pointers or flags.

11. The method of claim 9, further comprising the step of determining whether the mobile computing device is mobile between networks, access points, or both, wherein use of the one or more internet protocol addresses is inhibited if the mobile computing device is determined to be mobile between networks, access points, or both.

12. The method of claim 9, further comprising the step of determining whether the mobile computing device is stationary, wherein the at least one temporarily deleted internet protocol address is restored if the mobile computing device is determined to be stationary.

13. The method of claim 9, further comprising the step of monitoring for a network event selected from the group comprising: network connection events, network disconnection events, and network reconnection events, wherein use of the one or more internet protocol addresses is inhibited upon occurrence of said network event.

14. The method of claim 9, wherein use of the one or more internet protocol addresses is inhibited upon disconnection of the mobile computing device from the wireless network.

15. The method of claim 9, wherein use of the one or more internet protocol addresses is inhibited prior to initiating connection of the mobile computing device to the wireless network.

16. The method of claim 9, wherein requesting the new valid internet protocol address is performed using a non-abbreviated procedure for requesting allocation of the new internet protocol address from a DHCP server.

17. The method of claim 9, wherein the method is facilitated at least in part by a software agent, the software agent transferred from a memory of the mobile wireless communication device to the mobile computing device, the software agent configured to initiate and perform the configuration operation.

18. A non-transitory computer readable medium having recorded thereon statements and instructions for execution by a computer to carry out a method for connection of a mobile computing device to a wireless network via a mobile wireless communication device operatively coupled to the mobile computing device, said mobile computing device previously connected to one or more network access points using corresponding one or more internet protocol addresses, said one or more internet protocol addresses stored in a memory of said mobile computing device, the method comprising:
   initiating a configuration operation for configuring the mobile computing device, the configuration operation initiated by the mobile wireless communication device;
   wherein the configuration operation causes the mobile computing device to: make a presumption that the one or more stored internet protocol addresses are potentially invalid due to a change in location of the mobile computing device; and
   inhibit use of the one or more stored internet protocol addresses stored in said memory by deleting the one or more stored internet protocol addresses from said memory following said presumption, wherein at least one of the one or more internet protocol addresses is temporarily deleted, thereby influencing said mobile computing device to request a new valid internet protocol address, said mobile computing device being communicatively linked to a network access point through the mobile wireless communication device;
   and restoring the at least one temporarily deleted internet protocol address.

* * * * *